United States Patent
Lyon

(10) Patent No.: US 7,571,635 B2
(45) Date of Patent: Aug. 11, 2009

(54) ENGINE KNOCK DETECTION SYSTEM AND METHOD

(75) Inventor: Kim M. Lyon, Bloomfield Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 89 days.

(21) Appl. No.: 11/743,196

(22) Filed: May 2, 2007

(65) Prior Publication Data
US 2008/0271519 A1    Nov. 6, 2008

(51) Int. Cl.
*G01L 23/22* (2006.01)

(52) U.S. Cl. .................... 73/35.01; 73/35.07

(58) Field of Classification Search .............. 73/35.01, 73/35.03, 35.04, 35.06, 114.15, 114.21, 35.07; 123/406.26, 406.37
See application file for complete search history.

(56) References Cited

U.S. PATENT DOCUMENTS

| | | | |
|---|---|---|---|
| 4,236,491 A * | 12/1980 | Hattori et al. | 123/406.37 |
| 5,005,547 A * | 4/1991 | Suga et al. | 123/406.26 |
| 5,313,826 A * | 5/1994 | Klauber et al. | 73/114.15 |
| 5,323,643 A * | 6/1994 | Kojima et al. | 73/114.21 |
| 5,406,921 A | 4/1995 | Noble et al. | |
| 5,408,870 A | 4/1995 | Noble et al. | |
| 5,492,007 A | 2/1996 | Noble et al. | |
| 5,526,788 A | 6/1996 | Noble et al. | |
| 5,823,280 A | 10/1998 | Lateur et al. | |
| 5,869,752 A * | 2/1999 | Klauber et al. | 73/114.15 |
| 5,984,033 A | 11/1999 | Tamagawa et al. | |
| 6,036,285 A | 3/2000 | Murphy | |
| 6,119,063 A | 9/2000 | Hieb et al. | |
| 6,123,163 A | 9/2000 | Otsu et al. | |
| 6,260,644 B1 | 7/2001 | Otsu et al. | |
| 6,553,958 B1 | 4/2003 | Kolmanovsky et al. | |
| 6,845,305 B1 | 1/2005 | Raftari et al. | |
| 7,111,611 B1 | 9/2006 | Lyon | |

* cited by examiner

*Primary Examiner*—Helen C. Kwok
(74) *Attorney, Agent, or Firm*—Ralph E. Smith

(57) ABSTRACT

An engine knock detection system for a vehicle engine includes a controller receiving an input indicative of strain applied to an engine component and an output for providing a signal indicative of engine knock. A sensor may be associated with the engine that measures operating parameters of the engine (i.e., strain, for example) to allow the controller to detect and identify engine knock. The sensor may include a Surface-Acoustic Wave (SAW) sensor, such as, for example, a double-SAW sensor that concurrently detects engine torque.

6 Claims, 1 Drawing Sheet

ENGINE KNOCK DETECTION SYSTEM AND METHOD

FIELD OF THE INVENTION

The present invention relates to engine knock detection systems and more particularly to an engine knock detection system incorporating a surface acoustic wave sensor.

BACKGROUND OF THE INVENTION

Conventional engine knock detection systems typically rely on a plurality of sensors disposed at various locations of a vehicle engine to identify an engine-knock condition. While such sensors adequately provide an accurate indication of engine knock, such sensors are costly and result in a complex detection system. Furthermore, such sensors are sensitive to the particular placement on and around the engine, thereby resulting in increased system design costs and limited sensitivity to engine knocking during operation of the engine.

SUMMARY OF THE INVENTION

An engine knock detection system for a vehicle engine includes a controller receiving an input indicative of strain applied to an engine component and an output for providing a signal indicative of engine knock. A sensor may be associated with the engine that measures operating parameters of the engine (i.e., strain, for example) to allow the controller to detect and identify engine knock. The sensor may include a Surface-Acoustic Wave (SAW) sensor, such as, for example, a double-SAW sensor that concurrently detects engine torque.

Further areas of applicability of the present invention will become apparent from the detailed description provided hereinafter. It should be understood that the detailed description and specific examples, while indicating an embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
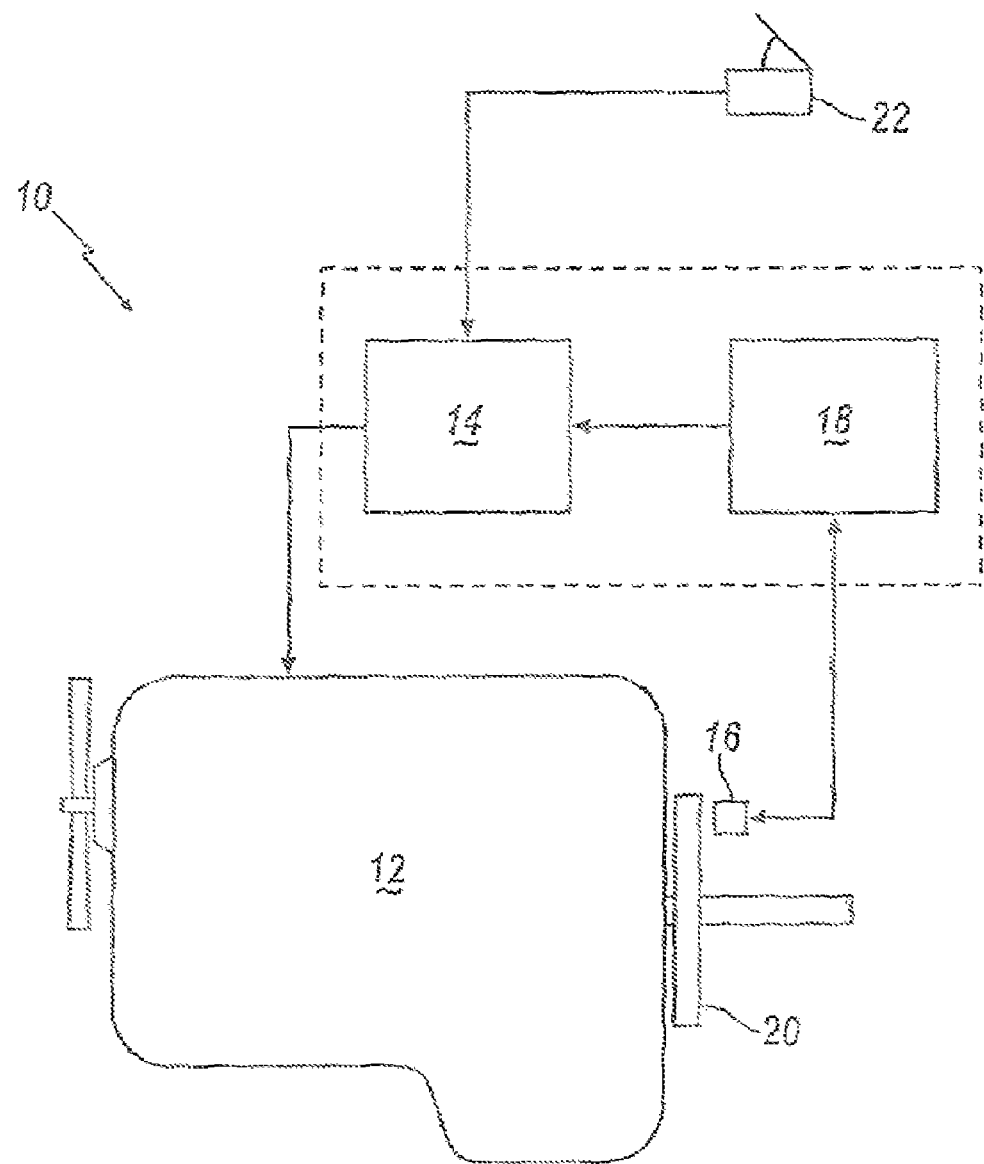
FIG. 1 is a schematic representation of an engine detonation detection system in accordance with the principals of the present invention incorporated into a vehicle powertrain.

The following description of the preferred embodiments is merely exemplary in nature and is in no way intended to limit the invention, its application, or uses.

With reference to the figures, an engine detonation detection system 10 is provided for detecting engine detonation (i.e., knock) of an engine 12. In the illustrated embodiment, the detection system 10 includes a controller 14 having an input for receiving a strain input indicative of strain applied to an engine component and an output for providing a signal indicative of engine knock. A sensor 16 is associated with the engine 12 and the controller 14 and measures operating parameters of the engine 12 (i.e., strain, in one embodiment) to allow the controller 14 to detect and identify engine knock.

The sensor 16 may include a Surface-Acoustic Wave (SAW) sensor, such as, for example, a double-SAW sensor. A SAW-type sensor may function as a resonator whose resonant frequency changes, as the sensor is strained. A SAW-type sensor may be wirelessly excited using ratio frequencies (i.e., RF energy) and the resonant frequency response may be measured allowing the strain to be determined. Strain may be determined by comparing the measured frequency response to the RF excitation energy frequency, thus allowing a given strain value to be determined. An equivalent engine output torque value may then be calculated by controller 14.

When configured as a wireless sensor, the sensor 16 may be connected to an engine flywheel or drive-plate 20, or other powertrain component, such as the output shaft of engine 12 and various transmission components (not shown). The controller 14 may otherwise communicate with a sensor processor 18 that excites sensor 16 and measures the resonant frequency response.

The sensor 16 may concurrently generate a signal indicative of engine torque for use by the controller 14 in controlling the engine 12. The presence of engine knock may superimpose a unique signature to a normal torque curve identified by the sensor 16 and generated by the controller 14. This unique signature or waveform may be identified by the controller 14, thereby allowing the controller 14 to identify an engine-knock condition. The sensor 16 is preferably of the type disclosed in Assignee's commonly owned U.S. Pat. No. 7,111,611, the disclosure of which is hereby incorporated by reference.

In the embodiment shown in FIG. 1, the controller 14 may receive an engine torque input command from a vehicle throttle pedal 22, for example. The engine torque output command generated by controller 14 is configured to control at least one of delivery of fuel to the engine 12, engine ignition, engine valve timing, electronic throttle control set-point, and intake manifold tuning configuration. The feedback provided by sensor 16 may be used to control the engine 12 in a closed-loop manner based on a level of strain detected by the sensor 16 and may be used to reduce engine knock by adjusting operation of the engine 12.

In an embodiment, the controller 14 may be configured to store engine knock measurements in the matrix that correlates an engine knock measurement with at least one vehicle operating parameter, such as, for example, engine speed, engine load, charge-air temperature, barometric pressure, engine coolant temperature, and engine accessory load. The "matrix" may comprise various, charts, tables, templates, and other arrays or formats of data. If desired, the matrix may be an adaptive matrix, whereby stored engine knock measurements are periodically updated to maintain an accurate map of engine knock.

When so equipped, the controller 14 may be configured to selectively review the adaptive matrix of stored engine knock measurements and to predict future engine knock based on one or more vehicle operating parameters. The adaptive matrix may be initially populated with nominal values of engine knock for one or more vehicle operating parameters using the measurements obtained by sensor 16. When so operated, the controller 14 may update the adaptive matrix with engine knock measurements during initial operation of the engine and/or throughout the operative life of engine 12 to account for engine component wear or tolerance effects.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method comprising:
    mounting a surface-acoustic wave sensor on an engine drive plate;
    generating a signal indicative of a micro-strain imparted on said engine drive plate; and
    determining an engine-knock condition based on said generated signal.

2. The method of claim 1, further comprising generating an engine torque based on said generated signal.

3. The method of claim 1, wherein said determining said engine-knock condition includes identifying an engine-knock signature on an engine-torque waveform.

4. The method of claim 1, further comprising storing engine-knock measurements in a matrix.

5. The method of claim 4, further comprising correlating said engine-knock measurements with at least one vehicle operating parameter.

6. The method of claim 5, wherein correlating said engine knock measurements with at least one vehicle operating parameter includes correlating said engine knock measurements with at least one of engine speed, engine load, charge-air temperature, barometric pressure, engine coolant temperature, and engine accessory load.

* * * * *